May 4, 1943.  E. J. SATTLER  2,318,424
MILK PAIL
Filed Dec. 5, 1941   2 Sheets-Sheet 1
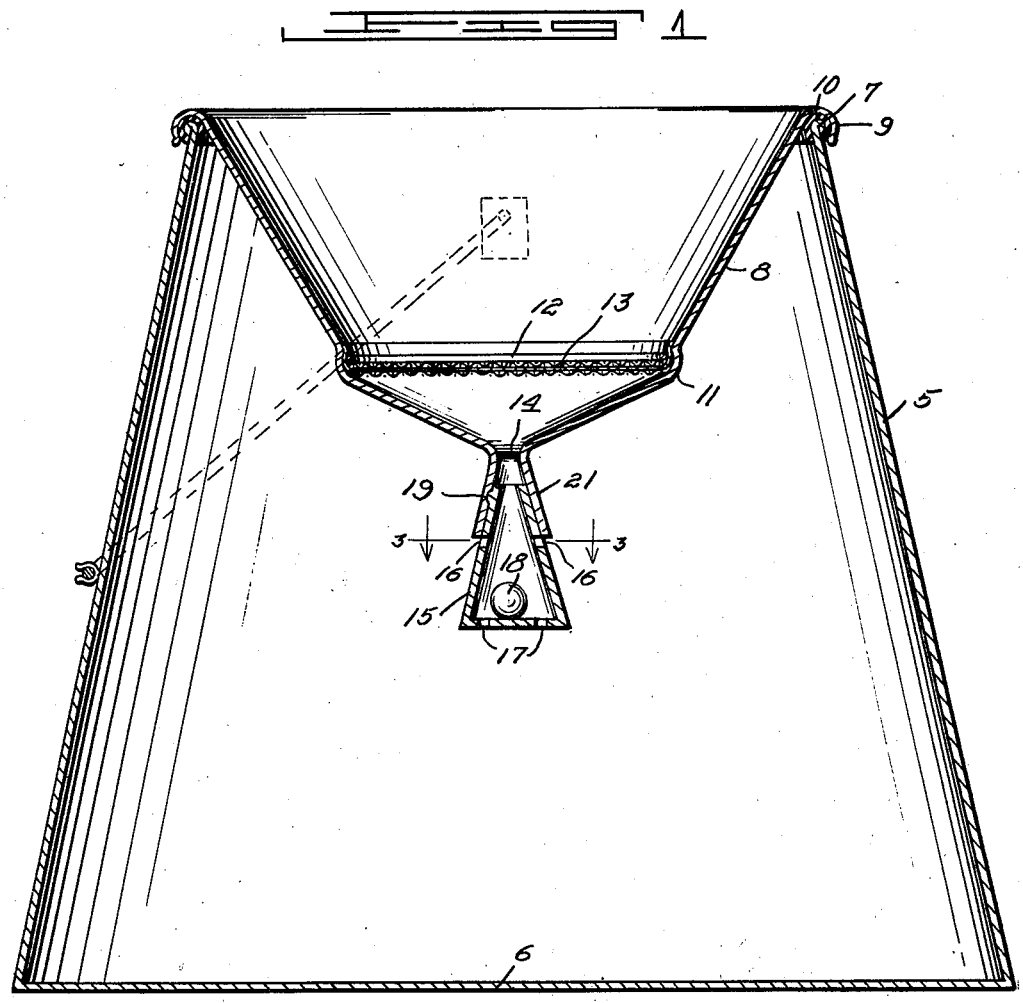
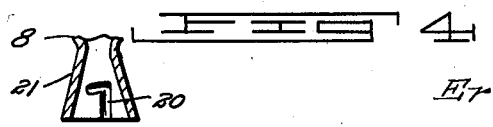
Inventor
Erno John Sattler
By *Clarence A. O'Brien*
Attorney May 4, 1943.  E. J. SATTLER  2,318,424
MILK PAIL
Filed Dec. 5, 1941  2 Sheets-Sheet 2
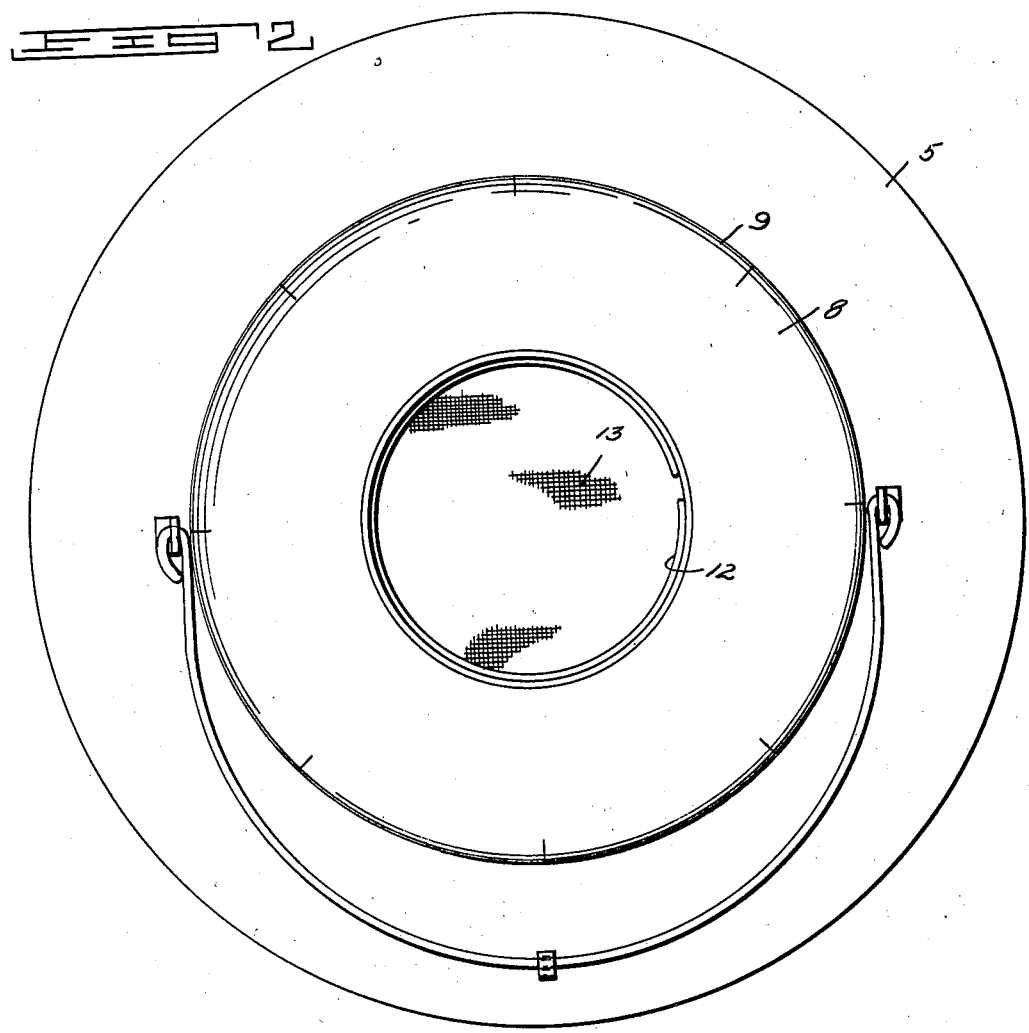
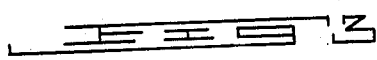
Inventor
Erno John Sattler
By *Clarence A. O'Brien*
Attorney Patented May 4, 1943

2,318,424

UNITED STATES PATENT OFFICE 2,318,424

MILK PAIL

Erno John Sattler, Edna, Tex.

Application December 5, 1941, Serial No. 421,814

1 Claim. (Cl. 31—52)

This invention relates to new and useful improvements in milk pails such as are used when milking cows.

The principal object of the present invention is to provide a milk pail which is provided with automatic valve means which will prevent the spilling of milk should the pail be accidentally upset.

Other objects and advantages of the invention will become apparent to the reader of the following description.

In the drawings—

Figure 1 represents a vertical sectional view through the pail.

Figure 2 is a top plan view of the pail.

Figure 3 is a cross section on the line 3—3 of Figure 1.

Figure 4 is a fragmentary vertical sectional view through the socket.

Referring to the drawings wherein like numerals designate like parts, it can be seen in Figure 1, that numeral 5 denotes an upwardly tapering pail having a bottom 6 and formed with a rolled bead 7 at its upper edge.

Numeral 8 denotes a downwardly tapering funnel provided with a backwardly curved and transversely split edge portion 9 which can be sprung over the bead 7 and over the packing strip 10 located thereon.

A circumferentially extending offset 11 is provided in the lower portion of the funnel 8 and this receives an annular frame 12 in which is a mesh strainer 13.

The bottom of the funnel 8 has a very small orifice 14 through which the milk can drain into a conical-shaped valve shell 15 which has openings 16 in the side thereof and openings 17 in the bottom thereof. A free ball 18 is provided in the shell.

The upper neck portion of the shell 15 has a stud 19 which is disposable in a bayonet groove 20 at the inside of a downwardly flaring socket structure 21 at the orifice 14, for the purpose of securing the valve shell 15 to the socket 21.

It can now be seen that as a cow is being milked, the milk flows onto the screen 13, draining through the orifice to the shell 15 and out of the openings 16 and 17 to the pail proper. However, should the pail be kicked over or otherwise upset the ball 18 will close the neck portion of the shell 15 and prevent the escape of milk.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A milk pail having a funnel-shaped depending top terminating in a downwardly flaring spout, an upwardly tapering flat bottomed shell fitting upwardly part way into said spout and detachably connected thereto, said shell being perforated below said spout in the sides and bottom thereof to discharge milk therefrom, and a ball in said shell of a size to close the shell between the top of the same and said perforations.

ERNO JOHN SATTLER.